(12) United States Patent
Brockett et al.

(10) Patent No.: US 9,761,433 B1
(45) Date of Patent: Sep. 12, 2017

(54) COMPACT AIR-CAVITY ELECTRODELESS HIGH INTENSITY DISCHARGE LAMP WITH COUPLING SLEEVE

(71) Applicant: SPL Industries USA, Inc., Encino, CA (US)

(72) Inventors: Timothy J. Brockett, Malibu, CA (US); Gregg A. Hollingsworth, Tempe, AZ (US); Mehran Matloubian, Encino, CA (US)

(73) Assignee: SPL INDUSTRIES USA, INC., Encino, CA (US)

( * ) Notice: Subject to any disclaimer, the term of this patent is extended or adjusted under 35 U.S.C. 154(b) by 0 days.

(21) Appl. No.: 15/270,298

(22) Filed: Sep. 20, 2016

(51) Int. Cl.
| | |
|---|---|
| *H01J 1/50* | (2006.01) |
| *H01J 65/04* | (2006.01) |
| *H02J 50/12* | (2016.01) |
| *H02J 50/20* | (2016.01) |
| *H05B 41/24* | (2006.01) |
| *H01J 61/30* | (2006.01) |

(52) U.S. Cl.
CPC .......... *H01J 65/042* (2013.01); *H01J 61/302* (2013.01); *H02J 50/12* (2016.02); *H02J 50/20* (2016.02); *H05B 41/24* (2013.01)

(58) Field of Classification Search
CPC ........ H01J 65/042; H01J 50/12; H01J 61/302; H05B 41/24; H05B 50/20
USPC .......................... 313/160, 161, 594, 607, 634
See application file for complete search history.

(56) References Cited

U.S. PATENT DOCUMENTS 4,185,228 A * 1/1980 Regan ................... H01J 65/044
315/150

\* cited by examiner

*Primary Examiner* — Vip Patel
(74) *Attorney, Agent, or Firm* — Richard T. Ogawa; Ogawa P.C.

(57) ABSTRACT

A novel compact air-cavity electrodeless high intensity discharge lamp is disclosed that provides added flexibility in its design to improve performance and reliability. A coupling sleeve surrounds a bulb assembly that can replace the output coupling element require for effective operation of the lamp. The coupling sleeve couples the RF energy from the input coupling element to the bulb and the bulb assembly serves to provide the heat sinking needed for the bulb to operate within the temperature range necessary to achieve optimum performance with good reliability. Changing the design of the bulb assembly does not impact the resonant frequency of the air-cavity resonator. De-coupling the bulb assembly design from the operating frequency of the resonator gives more flexibility to designer to optimize the overall performance of the electrodeless HID lamp.

20 Claims, 9 Drawing Sheets

COMPACT AIR-CAVITY ELECTRODELESS HIGH INTENSITY DISCHARGE LAMP WITH COUPLING SLEEVE

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to devices and methods for generating light with electrodeless high intensity discharge (HID) lamps. More particularly, the present invention provides high intensity discharge lamps driven by a radio-frequency source without the use of electrodes inside a gas-filled vessel (bulb) and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, ultraviolet (UV) water treatment, UV curing, any combination of these, and the like.

High intensity discharge lamps provide extremely bright and broad spectrum light source. Typical conventional electroded HID manufactured today contains a bulb with a mixture of gas and metal halides that are excited to form a plasma using a high current passed through closely-spaced electrodes. This arrangement, however, suffers from deterioration of the electrodes over time, and therefore a bulb with continual degradation of performance and limited lifetime.

Electrodeless high intensity discharge lamps driven by radio frequency (RF) sources have been proposed in the prior art. Some configurations include a metal halide fill encased either in a bulb or a sealed recess within a dielectric body forming a waveguide, with RF energy being provided by an external source such as a magnetron or solid-state RF driver and introduced into the waveguide and heating the plasma resistively. Another example is provided by U.S. Pat. No. 6,737,809 B2, which shows a different arrangement. This patent shows an electrodeless bulb and a dielectric cavity forming a part of a resonant RF circuit with an RF driver (which produces and amplifies electromagnetic energy at radio frequencies) to provide excitation. Several limitations, however, exist with this approach. The dielectric cavity is spatially positioned around a periphery of the electrodeless bulb in an integrated configuration, which physically blocks a substantial portion of the light emitted from the bulb. In addition, the integrated ceramic and quartz bulb configuration is difficult to manufacture and limits the operation and reliability of the plasma-enclosing bulb. Furthermore, the dielectric material used in this approach is often costly because of the difficultly in manufacturing and also due to the high-purity that is required to achieve competitive performance for most lighting applications.

In another approach disclosed in U.S. Pat. Nos. 8,283,866 and 8,294,368, an air-cavity resonator with grounded coupling elements is used to provide advantages over previous dielectric waveguide/resonator approaches. The air cavity resonator eliminates the need to use costly dielectric material and the bulb is not surrounded by a dielectric material resulting in more efficient operation of the lamp. However, this approach has its own limitations. The air-cavity resonator has two coupling elements. An input coupling element that is connected at one end to the RF source and at the other end to the body of the resonator which is at ground potential. The output coupling element that is connected to the bulb at one end and at the other end is connected to the resonator body. An air gap separates the input and output coupling elements. The input coupling element couples the RF energy from the RF source to the output coupling element which in turn couples the RF energy to the bulb, ionizing the gas in the bulb, and vaporizing the metal halide to emit light. The bulb which is made from quartz or a transparent/translucent ceramic operates at a high temperature. In case of a quartz bulb for example the surface temperature of the quartz envelope can exceed 800° C. It is critical for efficient as well as reliable operation of the bulb to maintain the temperature of the bulb within a certain range. The output coupling element in addition to coupling RF energy to the bulb serves the critical role of removing enough heat from the bulb to ensure reliable operation of the bulb but not too much heat that results in excessive cooling of the bulb and less efficient operation. Consequently, the output coupling element has to be designed properly to provide the necessary operating temperature range for the bulb. Furthermore, depending on the metal halide used in the bulb and the slurry/epoxy used to attach the bulb to the output coupling element, the design of the output coupling element has to be changed to achieve the desired operating temperature for the bulb. However, changing the design (such as dimensions or material composition) of the output coupling element to accommodate the necessary temperature profile for the bulb, changes the operating frequency of the resonator. It is highly desirable to use the same lamp/resonator body with different types of bulbs and different output coupling element designs without having to change other dimensions of the resonator to ensure the operating frequency of the lamp stays constant.

From above, it is seen that techniques for improved electrodeless high intensity discharge lighting are highly desired.

BRIEF SUMMARY OF THE INVENTION

As mentioned above, previous embodiments of compact air-cavity electrodeless HID lamps with grounded coupling elements, such as described in U.S. Pat. Nos. 8,283,866 and 8,294,368, have an output coupling element where its dimensions and material composition has impact on the operating frequency of the lamp while also acting as a thermal transfer mechanism for the bulb. To be able to optimize the performance of the lamp, or by using different bulb designs and/or different methods for attaching the bulb, it is highly desirable to be able to adjust the thermal properties of the output coupling element (also called the bulb assembly) without changing the operating frequency or electromagnetic configuration of the lamp. In this invention a novel coupling sleeve is integrated with the lamp housing that makes the air-cavity design more flexible by de-coupling the optimization of the performance and operating frequency of the resonator from the thermal management of the bulb.

In a specific embodiment, the lamp consists of a resonator body (sometimes referred to as a "lamp housing"), with at least one opening, made from an electrically conductive material such as aluminum. The resonator body has an input coupling element, a bulb assembly, and a conductive sleeve. The input coupling element is also made from an electrically conductive material. It is connected at one end, through an RF connector or pass-through hole in the bottom plate of the resonator body, to an RF driver, and at the other end the input coupling element is connected to the opposite side of the resonator body which is at ground potential. The output coupling element is substituted with a bulb assembly which consists of two sections that are made from an electrically conductive material such as aluminum and a middle section that is electrically not conductive made from a dielectric or ceramic material such as alumina. The top conductive section of the bulb assembly has a hole in it to receive the bulb which is attached to it using a high temperature epoxy or slurry. The bulb is made from light-transmitting material such as quartz or transparent/translucent ceramic inside an inert gas such as argon or xenon and a combination of one or more metals and metal halides such as mercury, sodium, dysprosium, sulfur, indium bromide, scandium bromide, thallium iodide, holmium bromide, cesium iodide or other similar materials. The bulb shape and fill are designed in such a way that when exposed to electromagnetic energy, its contents form a plasma arc inside the envelope and produces high-intensity infrared, visible, and UV light. The electrically conductive section at the other end of the bulb assembly has a threaded portion that is used to screw-in the bulb assembly into the back-plate of the resonator body. The center non-conductive section of the bulb assembly serves to electrically isolate the bulb from the resonator body which is at the ground potential. A conductive sleeve, made from an electrically conductive material such as aluminum, in the form of hollow tube surrounds the bulb assembly with a small air gap separating the two. The conductive sleeve is connected at one end to the resonator body module and the other end is open protruding into an open region of the resonator body and extending to the edge of the top bulb assembly and ends near the bulb. The input coupling element transfers the RF energy from the RF driver to the coupling sleeve and results in a high electromagnetic field across the gap region formed between the coupling sleeve and resonator body that the bulb protrudes through. The high electromagnetic field ionizes the gas inside the bulb which then melts and vaporizes the metal halide inside the bulb causing an intense emission of infrared, visible, and UV radiation.

In this embodiment, the bulb assembly does not impact the operating frequency of the resonator and the length and size of the three sections comprising the bulb assembly can be varied to optimize the operating temperature of the bulb under the desired operating conditions. This gives the freedom to optimize the operating frequency of the resonator and operating the temperature of the bulb independently. The present invention achieves these benefits and others in the context of known process technology. However, a further understanding of the nature and advantages of the present invention may be realized by reference to the attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

Figure 1:
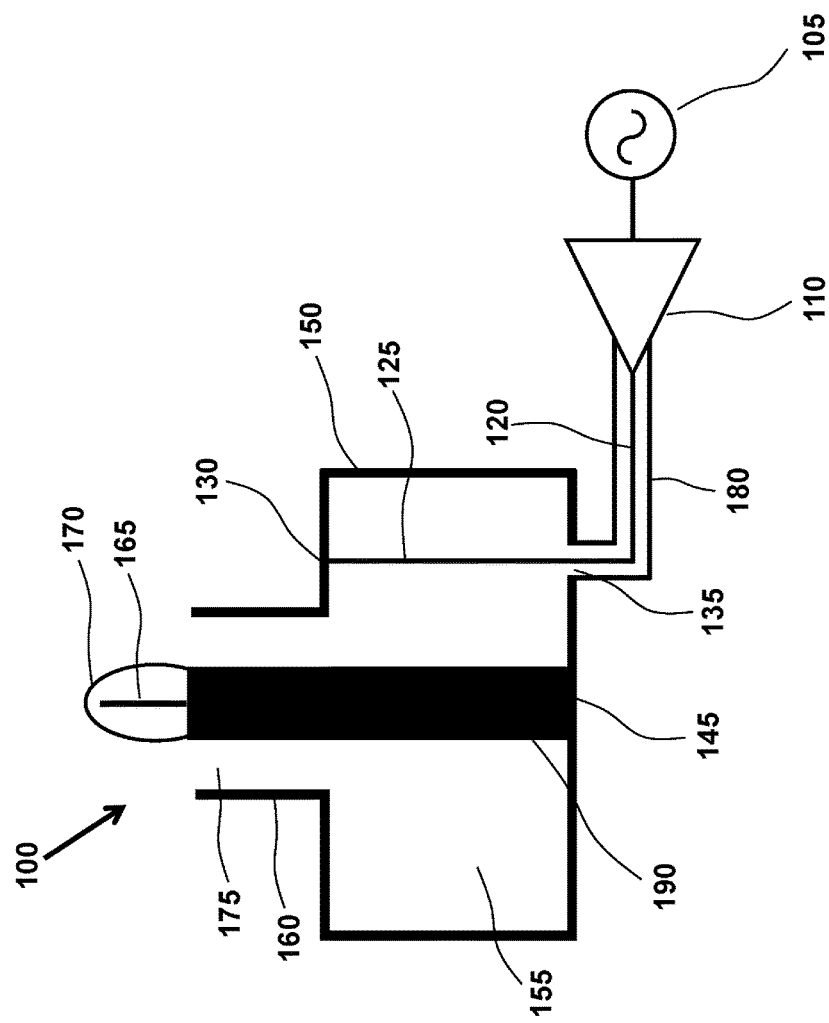
FIG. 1 is a drawing of a conventional compact air-cavity resonator electrodeless lamp.

The present invention is directed to devices and methods for generating light with electrodeless HID lamps. More particularly, the present invention provides high intensity discharge lamps driven by an RF source without the use of electrodes inside a bulb and related methods. Merely by way of example, such electrodeless HID lamps can be applied to applications such as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, UV water treatment, UV curing, any combination of these, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

As mentioned above, in previous embodiments of electrodeless high intensity discharge lamps with a compact air-cavity resonator the output coupling element serves both as an electromagnetic element of the resonator body and as a thermal path to remove heat from the bulb. Consequently, any changes to the output coupling element would affect both aspects of operation making it difficult to properly optimize the performance of the lamp. In this invention, an innovative coupling sleeve is integrated around the bulb assembly to separate the thermal aspects of the bulb and the electromagnetic design of the resonator body to allow for optimization of both independent from one another. In other words, the coupling sleeve now serves the function of coupling the RF energy from the input coupling element whereas the lamp assembly supports the bulb and serves as the heat sink for the bulb. Changing the dimensions and the material that bulb assembly is made from changes its thermal properties and as a result the operating temperature of the bulb. However, as long as the bulb assembly fits inside the coupling element, changing its dimensions or material properties will not have an impact on the operating frequency of the resonator. In effect this novel design has de-coupled optimization of the operating temperature of the bulb from operating frequency of the resonator allowing a more flexible lamp module design.

In a specific embodiment, the novel electrodeless high intensity discharge lamp consists of a compact air-cavity resonator. The resonator is made from a conductive material, such as aluminum, and can have any shape (circular, square, rectangular, cube, symmetrical, asymmetrical, etc.) with at least one opening that allows a bulb assembly to protrude through. The opening is customarily designed to arrange the electromagnetic wave/fields in a manner that transfers energy into the bulb efficiently. The resonator has an input coupling element which consists of an electrically conductive wire connected at one end through a pass-through hole (or RF connector) in the resonator body to an RF driver consisting of an RF oscillator, a high power RF amplifier, and supporting electronics. The other end of the input coupling element is connected to another end of the RF resonator pass-through to the resonator body which is at ground potential. The two ends are separated by a distance determined by the effective operation of the lamp. The bulb assembly comprises of a combination of two electrically conductive sections made from a metal such as aluminum, and a non-electrically conductive section that is still thermally conductive such as a dielectric material or ceramic such as alumina. The non-electrically conductive section isolates the two electrically conductive sections from each other while allowing a thermal path for the heat generated by the bulb to be dissipated in the resonator body. The sealed bulb is made from light-transmitting material such as quartz or transparent/translucent ceramic material. Inside the bulb there is an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. The bulb is attached using a high temperature epoxy or slurry to top section of the bulb assembly such that the majority of the bulb is still exposed. One end of the bulb assembly attaches to the bottom plate of the resonator body using a mounting mechanism such as a bolt or screw while the other end of the bulb assembly with the bulb protrudes through the opening at the top of the air-cavity resonator. Using this approach, the bulb assembly in the air-cavity resonator is replaceable. A coupling sleeve in the form of hollow tube and made from an electrically conductive material such as aluminum surrounds the bulb assembly and is separated from it by an air gap. The coupling sleeve is connected at one end to the bottom plate of the resonator body and the other end is open and it protrudes through the opening in the resonator body and extends to the end of the top section of the bulb assembly without blocking the plasma arc in the bulb. To operate, the input coupling element transfers the RF energy from the RF driver to the coupling sleeve and results in a high electromagnetic field across the gap between the coupling sleeve and resonator body. The high electromagnetic field ionizes the gas inside the bulb which then melts and vaporizes the metal halide inside the bulb causing an intense emission of infrared, visible, and UV radiation from the bulb. Dimensions of the coupling sleeve impact the resonant frequency of the resonator but as long as the bulb assembly can fit inside the coupling sleeve the dimensions and material that bulb assembly is constructed from will not impact the resonant frequency of the resonator. This gives the designer the freedom to construct the bulb assembly from materials and dimensions to allow the bulb to operate in a specific temperature range without changing the operating frequency of the resonator.

In another embodiment of this invention, the bulb assembly is constructed from a single section of dielectric or ceramic material. One end of the bulb assembly attaches to the bottom plate of the air-cavity resonator using a mounting mechanism such as a bolt or screw while the other end of the bulb assembly with the bulb protrudes through the opening at the top of the air-cavity resonator. A coupling sleeve is used to couple the RF energy from the input coupling element to the bulb. The properties of the dielectric material used for the bulb assembly are selected to achieve the desired temperature profile for the bulb and does not have an impact on the resonant frequency of the resonator.

In yet another embodiment of this invention, the bulb assembly consists of a combination of two electrically conductive sections made from a metal such as aluminum, and a non-electrically conductive section that is still thermally conductive such as a dielectric material or ceramic such as alumina separating the two electrically conductive sections from each other while allowing a thermal path for the heat generated by the bulb to be dissipated in the resonator body. The top metal section has a narrower diameter than the rest of the bulb assembly for a portion of its length. By narrowing a section of the bulb assembly the heat flow from the bulb to the lamp body can be reduced and result in an increase in the operating temperature of the bulb. Once again a coupling sleeve is used to couple the RF energy from the input coupling element to the bulb so reducing the diameter of one section of the lamp assembly has no impact on the operating frequency of the resonator.

In another embodiment of this invention the coupling sleeve consists of an electrically conductive top section made from a metal such as aluminum and a non-electrically conductive bottom section made from a dielectric or ceramic material such as alumina. The bottom section of the coupling sleeve is attached to the bottom plate of the resonator body. One end of an inductor is connected through a feed-through or RF connector in the resonator body to the top section of conductive sleeve and the other end of the inductor is connected to the ground potential. The inductor increases the overall inductance of the resonant cavity and results in lowering the resonant frequency of the resonator.

In another embodiment of this invention the inductor in the prior embodiment is replaced with a length of an RF cable such that the center conductor of the RF cable at one end is connected to the top section of the coupling sleeve through a feed-through or RF connector in the resonator body. The RF cable's shield is connected to the body of the resonator at one end and the other end is connected to the center conductor of the RF cable. The shorted/grounded RF cable effectively forms an inductor that will lower the resonant frequency of the resonator and by varying the length of the RF cable the resonant frequency can be adjusted.

In yet another embodiment of this invention, the inductor in the prior embodiment is integrated inside of the resonator cavity instead of through a feed-through or RF connector in the resonator body. The inductor is connected to the top section of conductive sleeve at one end and to the inside wall of the resonator body at the other end. The inductor serves to lower the resonant frequency of the air-cavity resonator without substantially changing the dimensions of the resonator body.

In another embodiment of this invention, the inductor in the prior embodiment is replaced with a variable inductor. By adjusting the value of this inductor the resonant frequency of the air-cavity resonator can be varied and tuned to the desired frequency of operation. The variable inductor will simplify the manufacturing process of the air-cavity resonator and lowers the tolerances needed for the dimensions of the resonator.

In yet another embodiment of this invention, the lumped inductor in prior embodiments is replaced with a circuit board with a printed or etched spiral inductor and is integrated inside the air-resonator cavity. One end of the spiral inductor is connected to the coupling sleeve and the other end of the spiral inductor is connected to the inside wall of the air-cavity. This spiral inductor will also serve to lower the operating frequency of the air-cavity resonator without substantially changing its dimensions.

One or more benefits may be achieved using this novel compact air-cavity resonator electrodeless HID lamp with coupling sleeve and related methods. As an example, performance of the lamp can be optimized to achieve higher light output and operate more efficiently and reliably. These and other benefits may be achieved in one or more embodiments. Further details of the present invention can be found throughout the present specification and more particularly below.

Detailed Descriptions of the Embodiments are Presented

FIG. 1 is a drawing of a conventional compact air-cavity resonator electrodeless lamp 100. The lamp consists of the resonator body 150 made from an electrically conductive material such as aluminum and is primarily filled with air 155. An input coupling element 125 and an output coupling element 190 also made from electrically conductive materials are separated by a gap. One end of the input coupling element is connected to an RF source consisting of an oscillator 105 and an amplifier 110 via an RF cable with a center conductor 120 and an outer jacket/shield 180 through a feed-through (or RF connector) 135 in the resonator body. The other end of the input coupling element is connected to the top of the resonator body 130 with the resonator body being at ground potential. One end of the output coupling element 190 is also connected to the resonator body 145 while the other end has a hole at the top to receive the bulb 170 which is attached to it using a high temperature epoxy or slurry. The plasma arc in the bulb 165 is substantially visible and it is not surrounded by the output coupling element or the resonator body. The bulb can be made from quartz or from a transparent/translucent dielectric material. It is filled with an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. The resonator body has a neck region 160 at the top of the resonator with air gap 175 separating the neck and the top of the output coupling element. The dimensions of the resonator including the capacitance of the neck region determine the operating frequency of the resonator (resonant frequency) and therefore the lamp. The input coupling element couples RF power from the RF source across the gap to the output coupling element. A high electric field is created between the output coupling element and the neck region of the resonator body. The high electric field ionizes the gas in the bulb which in turn vaporizes the metal halide resulting in intense light radiated by the bulb.

Figure 2A:
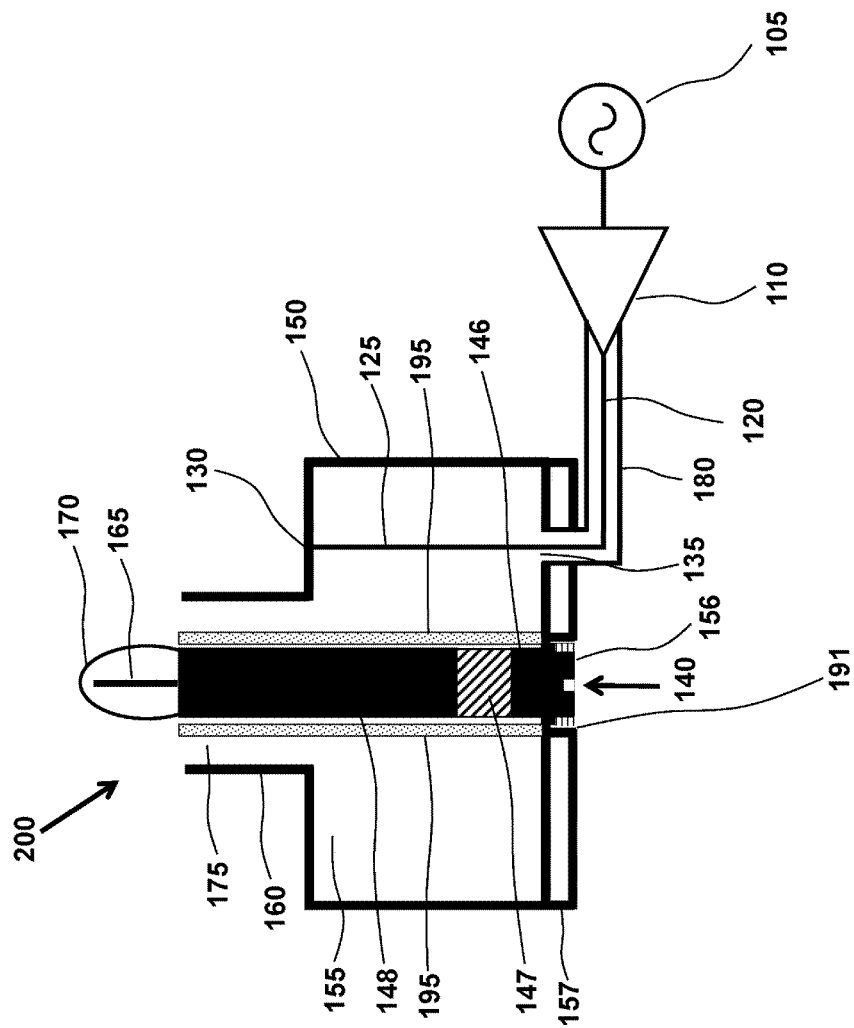
FIG. 2A is a drawing of one embodiment of this invention showing a compact air-cavity resonator electrodeless lamp with a coupling sleeve.

FIG. 2A is a drawing of one embodiment of this invention showing a compact air-cavity resonator electrodeless lamp 200 with a coupling sleeve 195. The lamp consists of the resonator body 150 made from an electrically conductive material such as aluminum and is primarily filled with air 155. An input coupling element 125 is connected to an RF source consisting of an oscillator 105 and an amplifier 110 via an RF cable with a center conductor 120 and an outer jacket/shield 180 through a feed-through (or RF connector) 135 in the resonator body. The other end of the input coupling element is connected to the top of the resonator body 130 with the resonator body being at ground potential. The bulb assembly 140 consists of several sections with sections 148 and 146 made from an electrically conductive material and section 147 made from an electrically non-conductive but thermally conductive material such as alumina. The bottom section 146 has a screw 156 at the end which allows the bulb assembly to be screwed into the back-plate 157 of the resonator body through hole 191. Section 147 electrically isolates the top section 148 from ground. The top of section 148 has a hole to receive the bulb 170 which is attached to it using a high temperature epoxy or slurry. The arc in the bulb 165 is substantially visible and it is not surrounded by the resonator body. The bulb can be made from quartz or from a transparent/translucent dielectric material. It is filled with an inert gas such as argon or xenon and a combination of one or more metals and metal halides such as mercury, sodium, dysprosium, sulfur, indium bromide, scandium bromide, thallium iodide, holmium bromide, cesium iodide, or other similar materials. The resonator body has a neck region 160 at the top of the resonator with air gap 175 separating the neck and the top of the coupling sleeve 195. The coupling sleeve consists of a cylindrical electrically conductive tube that surrounds the bulb assembly and is separated from it by an air gap. The coupling sleeve is connected to the resonator body (ground potential) at one end and is open at the other end extending the length of the bulb assembly to the edge of the bottom of the exposed part of the bulb. The dimensions of the resonator including the capacitance of the neck region determine the operating frequency of the resonator (resonant frequency) and therefore the lamp. The resonant frequency of the resonator is not dependent on the dimensions of the bulb assembly as long as the bulb assembly fits within the sleeve. This allows the thermal properties of the bulb assembly to be optimized without impacting the operating frequency of the lamp. The input coupling element couples RF power from the RF source across the gap to the coupling sleeve. A high electric field is created between the coupling sleeve and the neck region of the resonator body. The high electric field ionizes the gas in the bulb which in turn vaporizes the metal halide resulting in intense light radiated by the bulb.

Figure 2B:
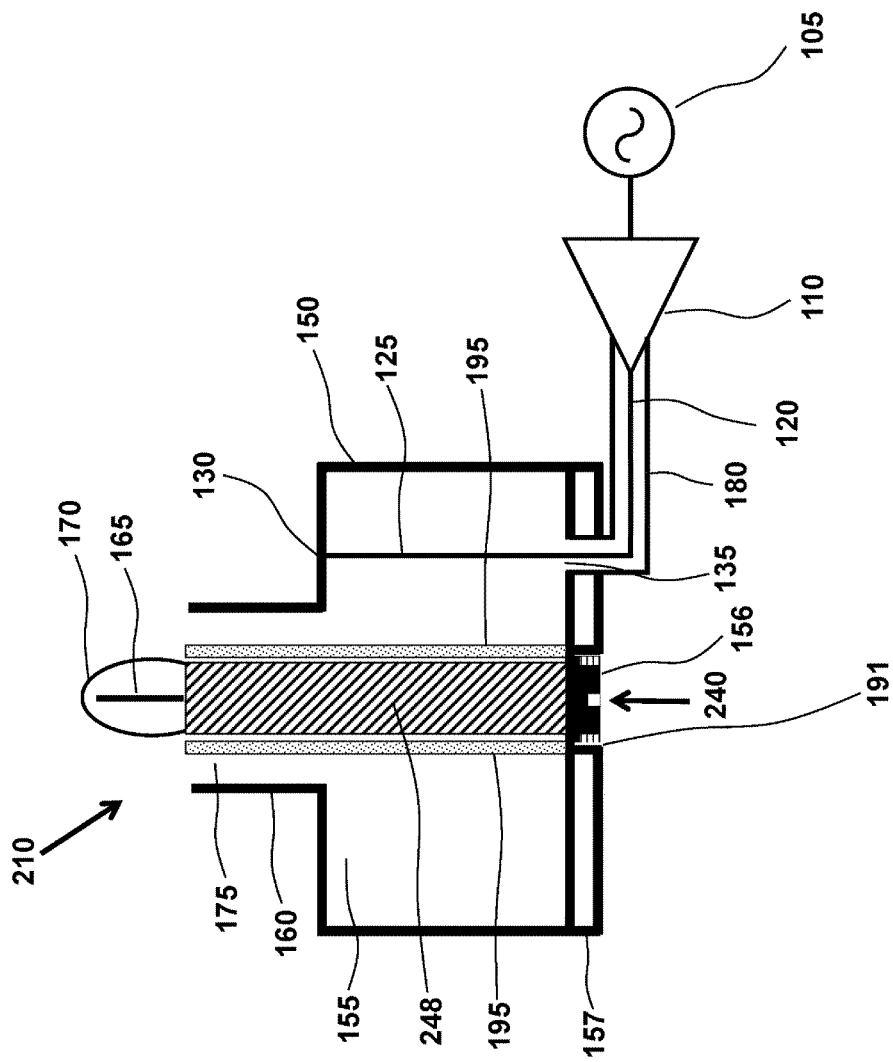
FIG. 2B is a drawing of another embodiment of this invention showing an electrodeless lamp similar to FIG. 2A but with a different bulb assembly.

FIG. 2B is a drawing of another embodiment of this invention showing an electrodeless lamp 210 similar to the one in FIG. 2A but with a different bulb assembly 240. In this embodiment the bulb assembly consists of a single section 248 made from a dielectric or ceramic material such as alumina. At one end it is attached to a metal screw 156 that is used to screw the bulb assembly into the back plate 157 of the lamp body 150. The other end of section 248 has a hole to receive the bulb 170 which is attached to it using a high temperature epoxy or slurry. The ceramic body of the bulb assembly serves to electrically isolate the bulb from the bottom plate of the resonator body. However, the use of the ceramic bulb assembly 240 instead of the composite bulb assembly 140 in FIG. 2A changes the thermal properties of the bulb assembly. By varying the thermal properties of the bulb assembly without changing the operating frequency of the lamp, the bulb assembly can be designed to move heat more efficiently from the bulb or alternatively isolate the bulb thermally from the resonator body to have the bulb run hotter. As mentioned earlier the temperature that the bulb operates at is critical to the efficiency of the lamp as well as the reliability of the bulb so having the ability to design the bulb assembly to optimize bulb efficiency without compromising reliability and impacting the operating frequency of the resonator is the major advantage of this invention.

Figure 2C:
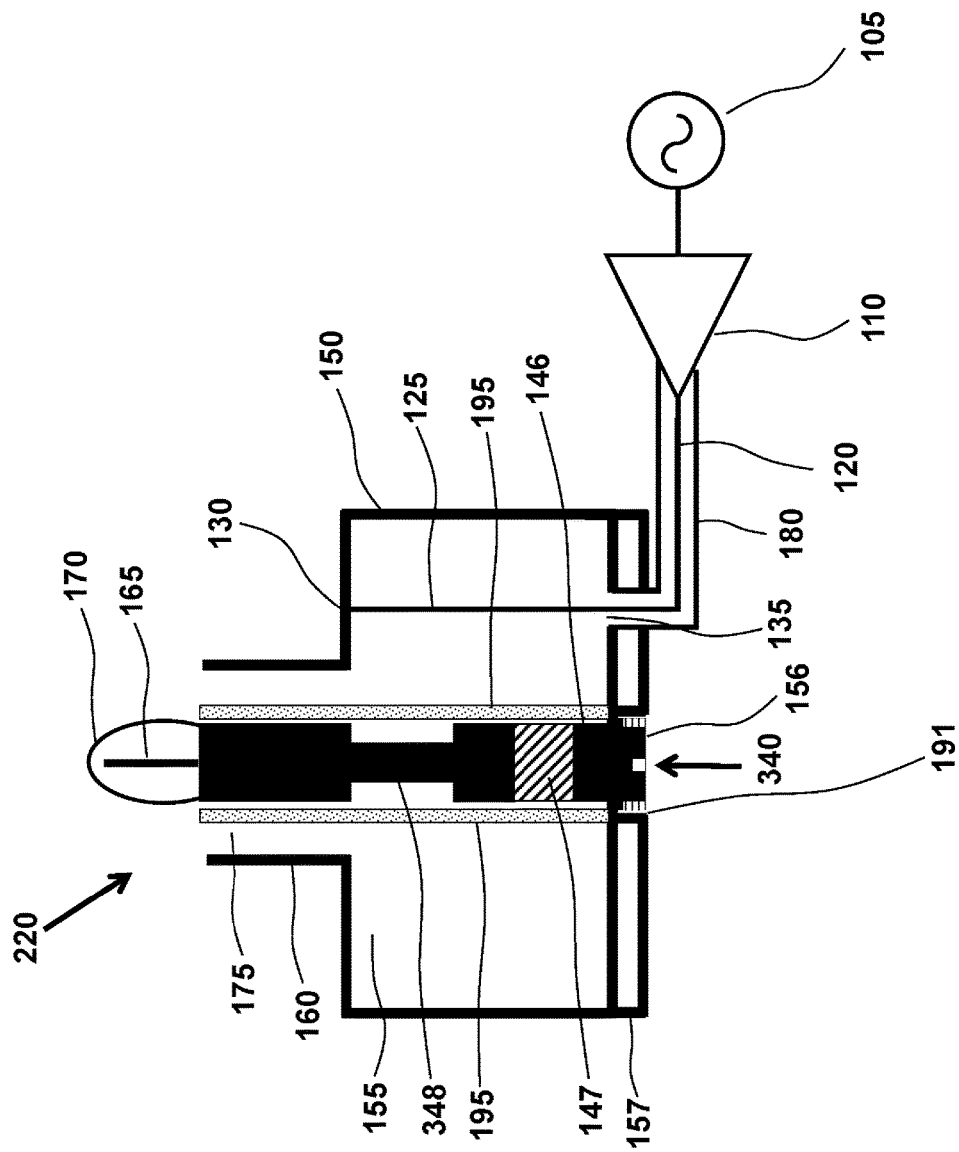
FIG. 2C is a drawing of yet another embodiment of this invention showing an electrodeless lamp similar to FIG. 2A but with a different bulb assembly.

FIG. 2C is a drawing of another embodiment of this invention showing an electrodeless lamp 220 similar to FIG. 2A but with a different bulb assembly 340. The bulb assembly 340 consists of several sections with sections 348 and 146 made from an electrically conductive material and section 147 made from an electrically non-conductive but thermally conductive material such as alumina. The bottom section 146 has a screw 156 at the end which allows the bulb assembly to be screwed into the back-plate 157 of the resonator body through hole 191. Section 147 electrically isolates the top section 348 from ground. The top of section 348 has a hole to receive the bulb 170 which is attached to it using a high temperature epoxy or slurry. The difference between the embodiments in FIG. 2A and FIG. 2C is in the top sections 148 and 348 of the bulb assembly. Section 148 has a constant diameter along its length while a portion of section 348 has a smaller diameter than the rest of section 348 reducing the overall thermal conductivity of bulb assembly 340 in FIG. 2C compared to the bulb assembly 140 in FIG. 2A. The ability to change the diameter of and length of this section can be used to change the overall thermal properties of the bulb assembly. By varying the thermal properties of the bulb assembly without changing the operating frequency of the lamp module, the bulb assembly can be designed to move heat more efficiently from the bulb or alternatively isolate the bulb thermally from the resonator body to have the bulb run hotter.

Figure 2D:
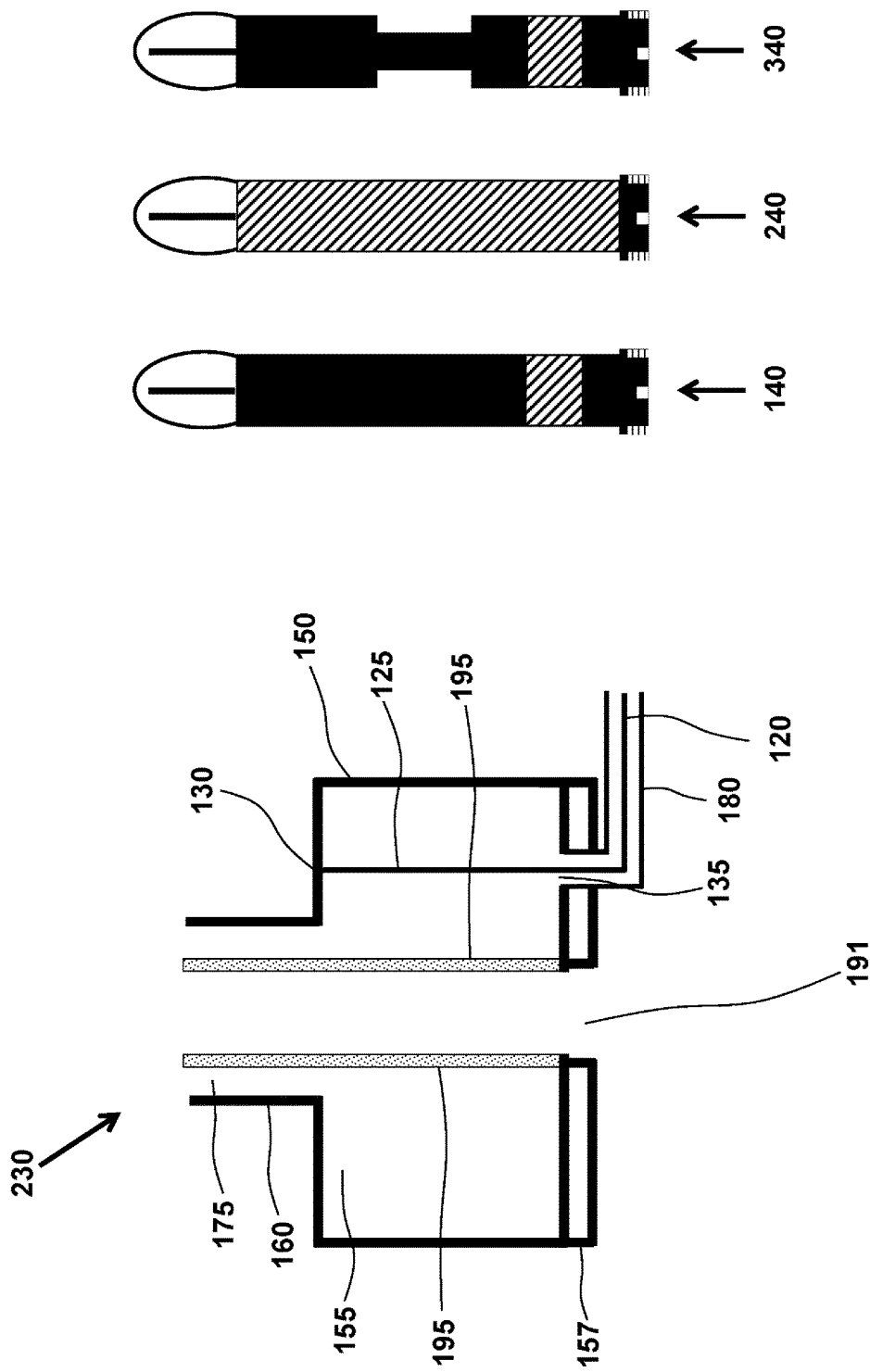
FIG. 2D is another drawing showing the resonator body of FIGS. 2A, 2B, and 2C and the different bulb assembly for each embodiment separately.

FIG. 2D is a drawing showing the electrodeless lamp 230 of the embodiments in FIGS. 2A, 2B, and 2C and the different bulb assemblies 140, 240, and 340 for each embodiment respectively. This Figure shows that the same resonator body 150 can be used with different bulb assembly designs and the various bulb assembly designs can change the thermal conductivity of the bulb assembly without changing the operating frequency of the lamp. This gives more flexibility for designing the lamp system.

Figure 3A:
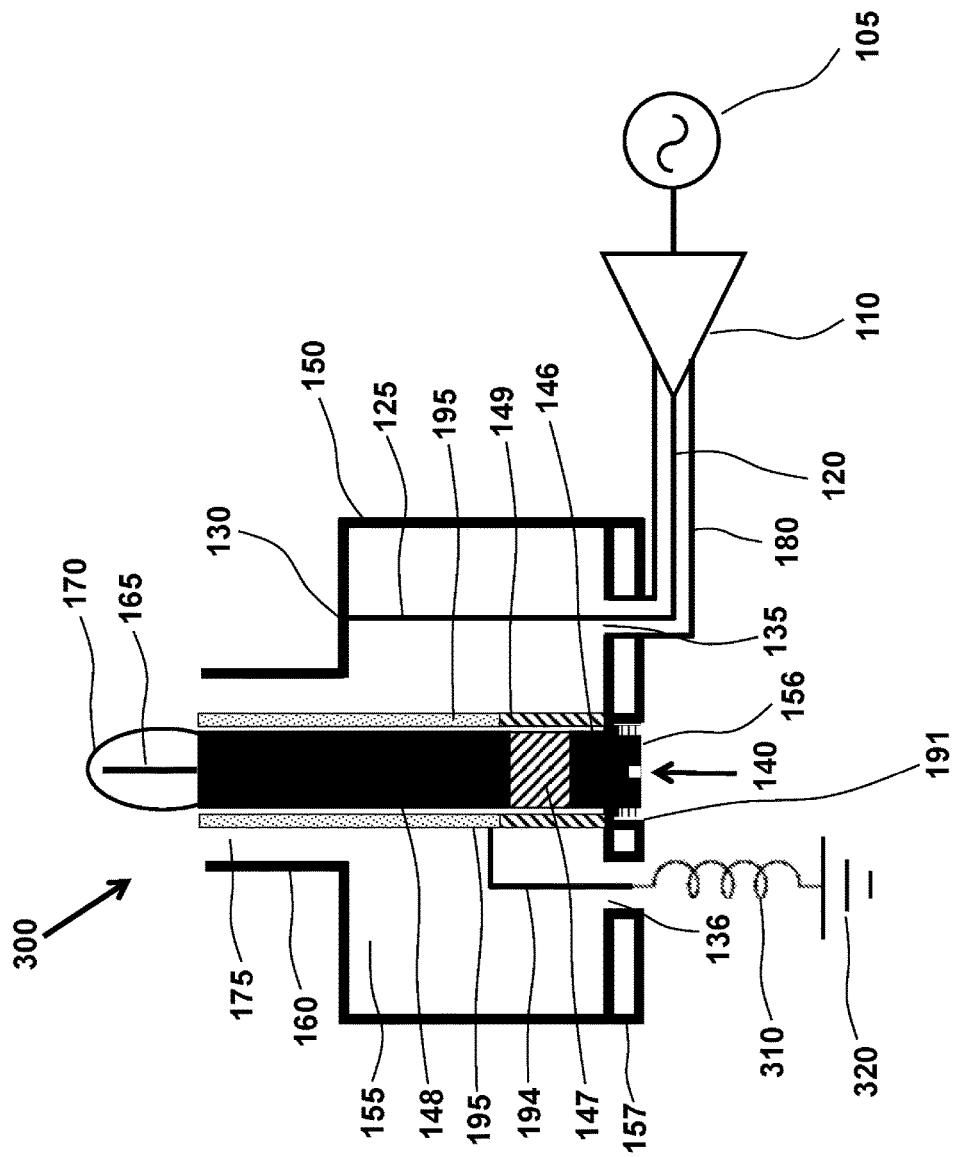
FIG. 3A is a drawing of another embodiment of this invention showing a compact air-cavity resonator electrodeless lamp with a coupling sleeve similar to the one in FIG. 2A except in this embodiment the sleeve is isolated from the body of the resonator and an inductor is connected between the top electrically conductive section of the sleeve and the ground.

FIG. 3A is a drawing of another embodiment of this invention with a compact air-cavity resonator electrodeless lamp 300 with a coupling sleeve similar to the one in FIG. 2A. In this embodiment the coupling sleeve consists of two sections. A lower section 149 made from an electrically non-conductive material such as a dielectric or ceramic (for example alumina or Teflon) and an upper section 195 made from an electrically conductive material such as aluminum. The upper section is connected to ground 320 through an electrical connection 194 to an inductor 310 through a hole in lamp body 136. Using the inductor 310 the operating frequency of the resonator body can be lowered without increasing the size of the resonator body.

Figure 3B:
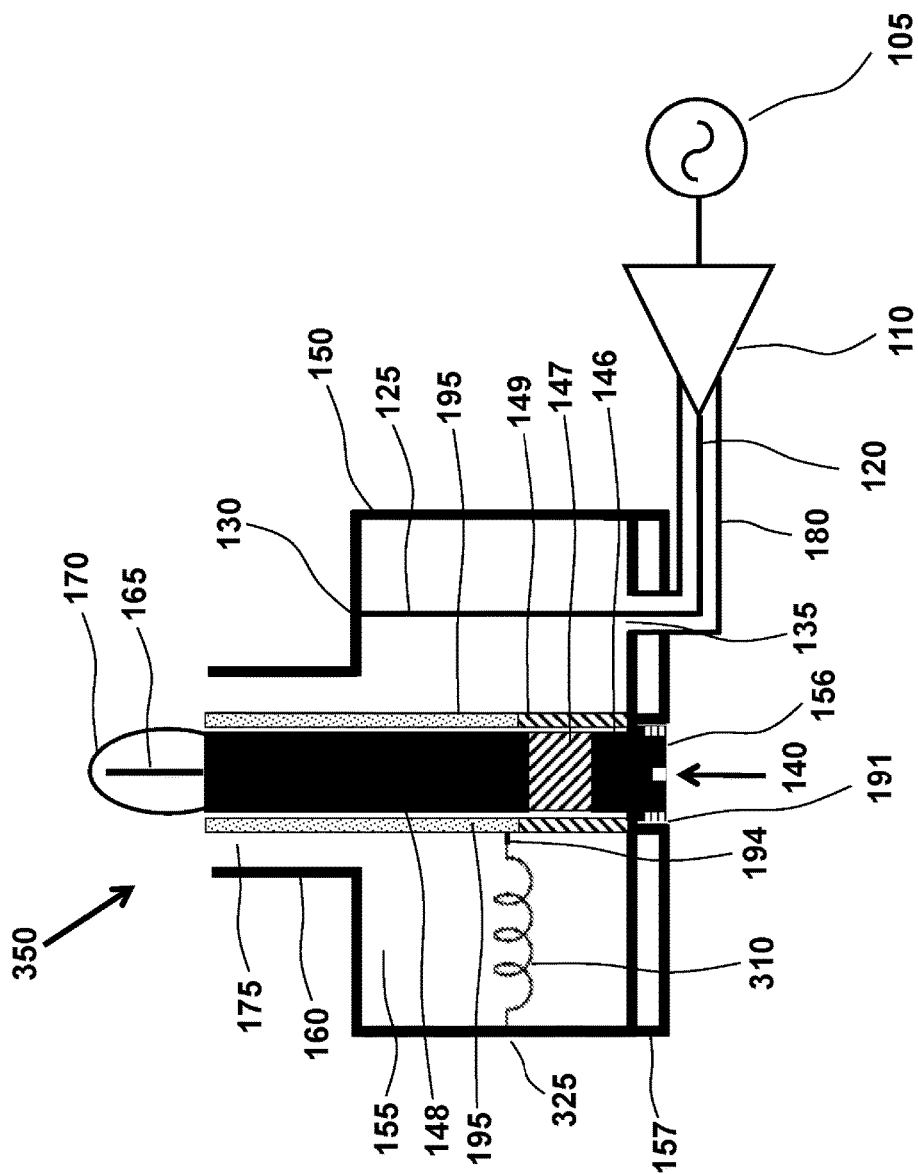
FIG. 3B is a drawing of another embodiment of this invention showing a compact air-cavity resonator electrodeless lamp with a coupling sleeve similar to the one in FIG. 3A but with the inductor integrated inside the resonator cavity.

FIG. 3B is a drawing of another embodiment of this invention showing a compact air-cavity resonator electrodeless lamp 350 with a coupling sleeve similar to the one in FIG. 3A. In this embodiment the inductor 310 is integrated into the resonator body and is connected to ground 325 of the lamp body 150.

Figure 4:
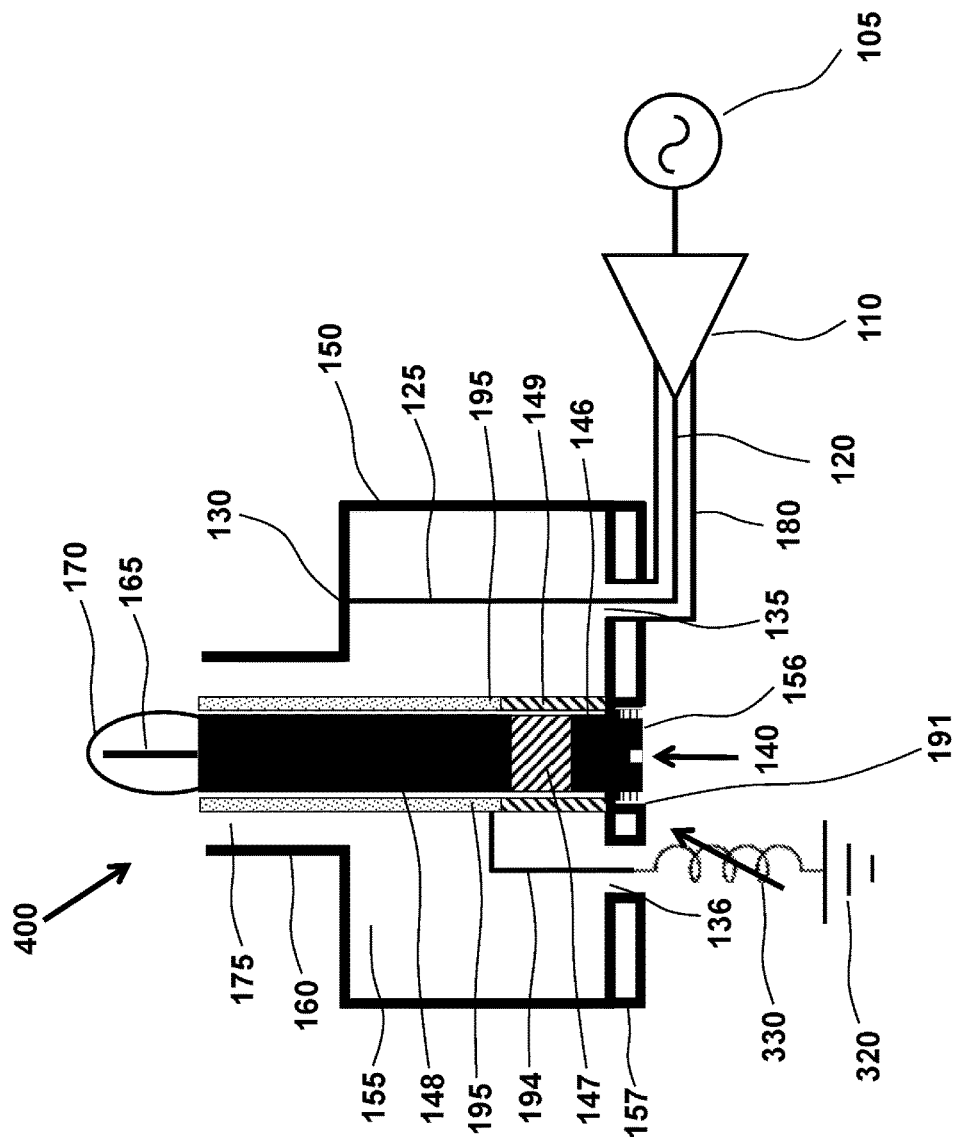
FIG. 4 is a drawing of another embodiment of this invention showing a compact air-cavity resonator electrodeless lamp with a coupling sleeve similar to the one in FIG. 3A but with the fixed inductor replaced with a variable inductor.

FIG. 4 is a drawing of another embodiment of this invention showing a compact air-cavity resonator electrodeless lamp 400 with a coupling sleeve similar to the one in FIG. 3A. In this embodiment the fixed inductor 310 in FIG. 3A is replaced with a variable inductor 330. The operating frequency of the resonator body can be changed by varying the inductance of the variable inductor.

Figure 5:
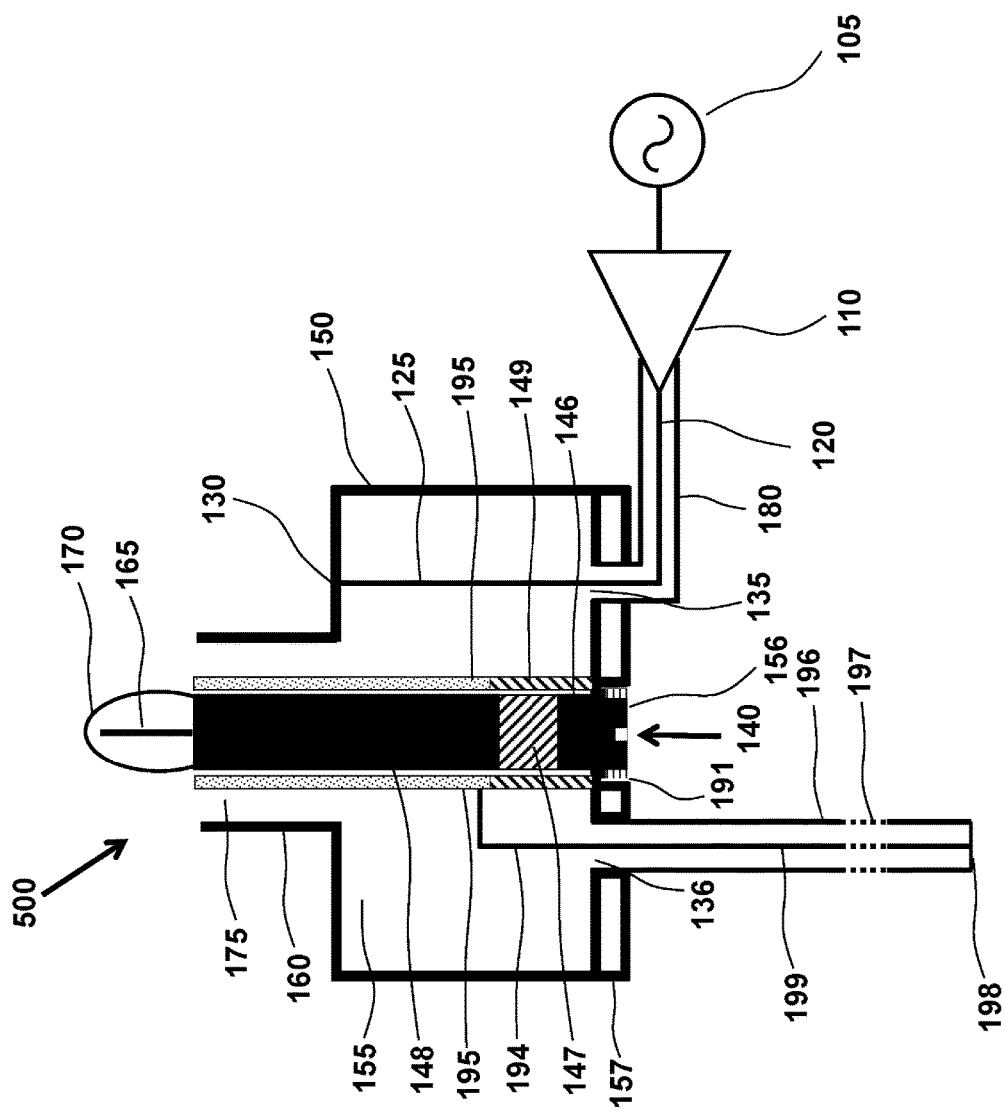
FIG. 5 is a drawing of another embodiment of this invention showing a compact air-cavity resonator electrodeless lamp with a coupling sleeve similar to the one in FIG. 3A but with the inductor replaced with a length of an RF cable.

FIG. 5 is a drawing of another embodiment of this invention showing a compact air-cavity resonator electrodeless lamp 500 with a coupling sleeve similar to the one in FIG. 3A. In this embodiment the fixed inductor 310 in FIG. 3A is replaced with a length of RF cable 196. The center conductor of the RF cable 199 is connected at one end through the wire 194 to top section of the coupling sleeve 195 and at the other end to ground 198 which can be the shield/jacket of the RF cable. By adjusting the length 197 of the RF cable the operating frequency of the resonator body can be varied.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrodeless high intensity discharge lamp comprising:
    an electrically conductive lamp module or housing having a spatial volume within the housing containing one or more openings;
    a bulb assembly, comprising of one or more sections of conductive and non-conductive materials and is isolated from a ground potential;

a vessel or bulb that has a combination of gas, liquid, metals, and metal halides contained within, attached to the lamp housing;

an RF driver comprising of an RF source, amplifier, and supporting electronics;

an input coupling element; and a coupling sleeve member that is separate from the bulb assembly and partially surrounds the bulb assembly and has an inner region facing an exterior region of the bulb assembly, the inner region being spatially separated from the exterior region of the bulb assembly;

a spatial gap shaped as an annular region provided between the exterior region of the bulb assembly and the inner region facing the exterior region of the bulb assembly;

a second spatial gap shaped as an annular region provided between the exterior region of the coupling sleeve and the aperture region of the lamp housing; and, a ground potential electrically coupled or connected to at least one end of the coupling sleeve member, and free from contact with the bulb assembly.

2. The lamp of claim 1 wherein the input coupling element has one end connected to the RF driver and its opposite end attached electrically to the lamp housing via a pass-through elsewhere in the lamp housing.

3. The lamp of claim 2 wherein the pass-through and attachment point of the input coupling element are separated by a certain distance that is based on effective operation of the lamp.

4. The lamp of claim 1 wherein the bulb assembly has one end of a conductive section attached to the bulb, a section of non-conductive material, and a third section of conductive material that is attached to the lamp housing.

5. The lamp of claim 1 wherein the coupling sleeve is in the form of a hollow metal tube surrounding the bulb assembly with one end connected to the lamp housing and the other end open and extending the length of the bulb assembly to the edge of the bulb.

6. The lamp of claim 1 wherein the input coupling element and the coupling sleeve are parallel to each other and separated by an air gap.

7. The lamp of claim 1 wherein the bulb assembly is made from a non-conductive, dielectric, or ceramic material and one end is attached to the lamp housing and the other end to the bulb.

8. The lamp of claim 1 wherein the coupling sleeve is made from a conductive section at the top and non-conductive section at the bottom connecting it to the lamp housing.

9. The lamp of claim 8 wherein an inductor is connected between the conductive top section of the coupling sleeve and the other end of the inductor is connected to the ground potential.

10. The lamp of claim 9 wherein the amount of inductance can be 0 nano-Henry to 1 milli-Henry.

11. The lamp of claim 9 where the value of inductance is chosen to allow the operating frequency to be less than 400 MHz.

12. The lamp of claim 9 wherein the inductor is replaced with a variable inductor.

13. The lamp of claim 9 wherein the inductor is replaced with a printed circuit board (PCB) that features a planar spiral inductor.

14. The lamp of claim 9 wherein the inductor is placed within the lamp module.

15. The lamp of claim 12 wherein the variable inductor is placed within the lamp module.

16. The lamp of claim 13 wherein the PCB is placed within the lamp module.

17. The lamp of claim 9 wherein the inductor is replaced with a length of RF cable that is connected to the top section of the coupling sleeve at one end and connected to ground potential at the other end of the cable.

18. The lamp of claim 1 wherein the bulb assembly is removable from lamp module.

19. The lamp of claim 1 wherein the dimensions and materials of the bulb assembly is selected to achieve a desired operating temperature range for the bulb.

20. A horticulture growing lamp apparatus, the apparatus comprising:

an electrodeless high intensity discharge lamp comprising:

an electrically conductive lamp module or housing having a spatial volume within the housing containing one or more openings;

a bulb assembly, comprising of one or more sections of conductive and non-conductive materials and is isolated from a ground potential;

a vessel or bulb that has a combination of gas and metal halides contained within, attached to the lamp module or housing;

an RF driver comprising of an RF source, amplifier, and supporting electronics;

an input coupling element;

a coupling sleeve member that is disconnected from the bulb assembly and surrounds the bulb assembly and has an inner region facing an exterior region of the bulb assembly, the inner region being spatially separated from the exterior region of the bulb assembly;

a spatial gap shaped as an annular region provided between the exterior region of the bulb assembly and the inner region facing the exterior region of the bulb assembly;

a second spatial gap shaped as an annular region provided between the exterior region of the coupling sleeve and the aperture region of the lamp housing;

a ground potential electrically coupled to at least one end of the coupling sleeve member, and free from contact with the bulb assembly; and a fill mixture provided within the gas-filled vessel to emit a color temperature ranging from 2000 to 8000 Kelvin.

* * * * *